July 17, 1962 J. H. STEIGLEDER 3,044,604
CONVEYORS
Filed Oct. 21, 1958 4 Sheets-Sheet 1
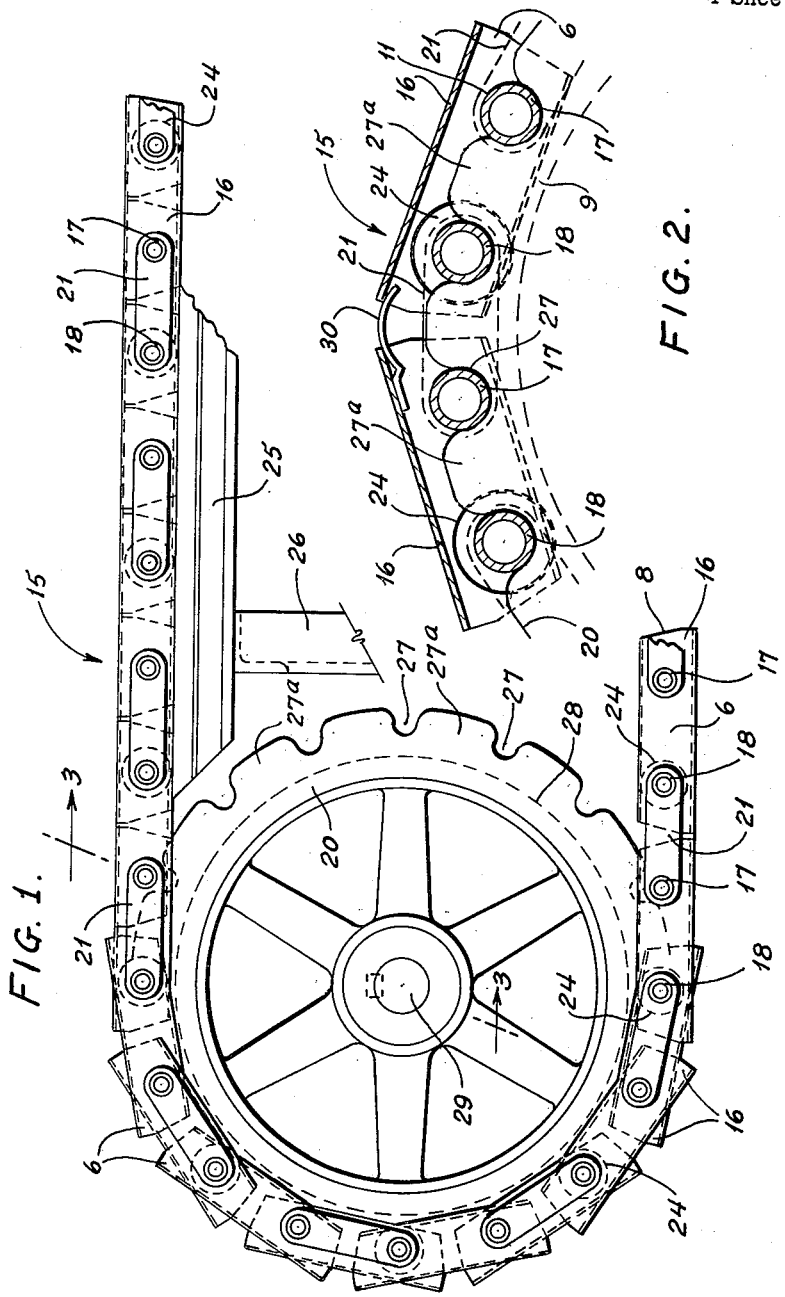
INVENTOR.
JOHANN HANS STEIGLEDER
BY
*Albert M. Parker*
ATTORNEY.

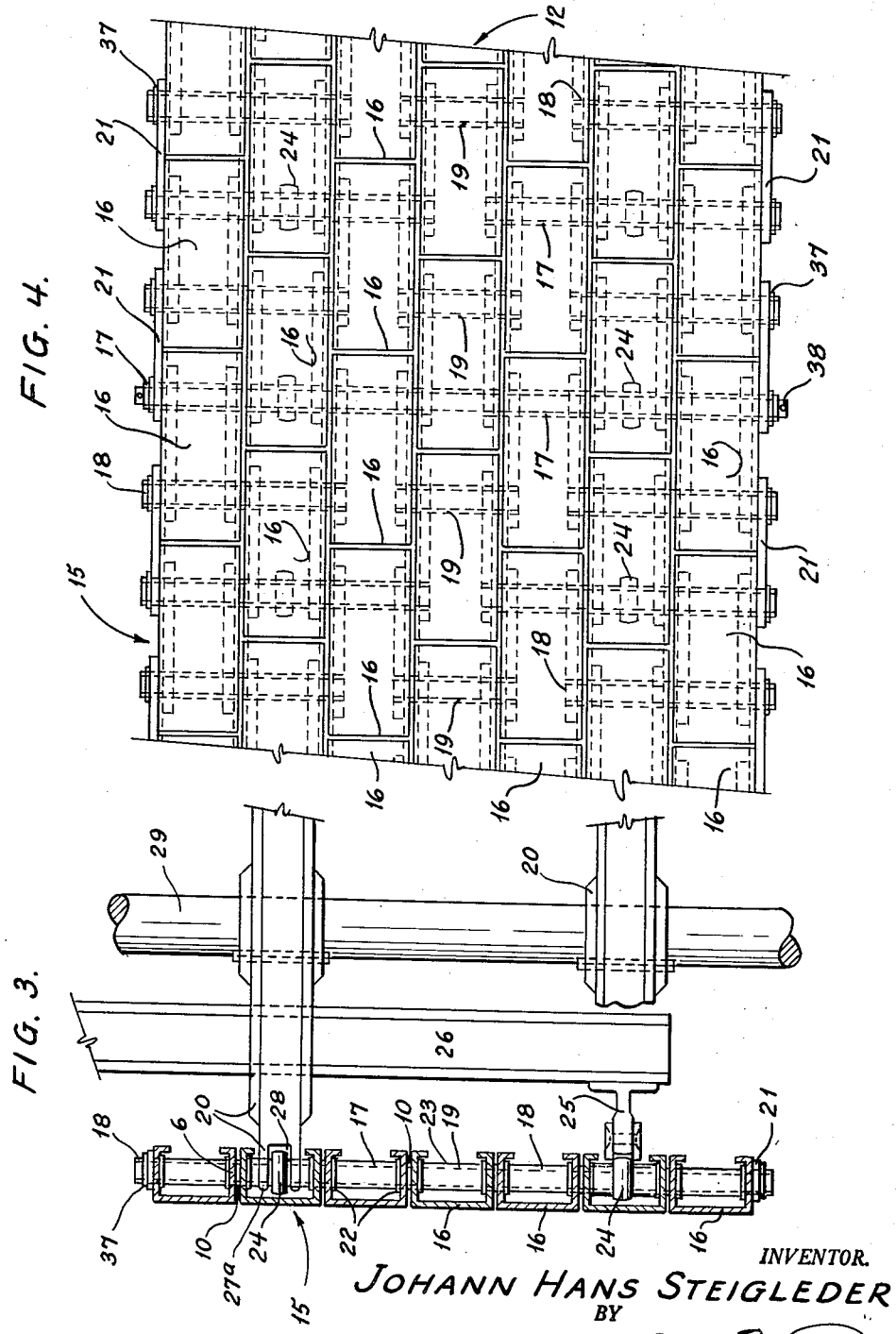

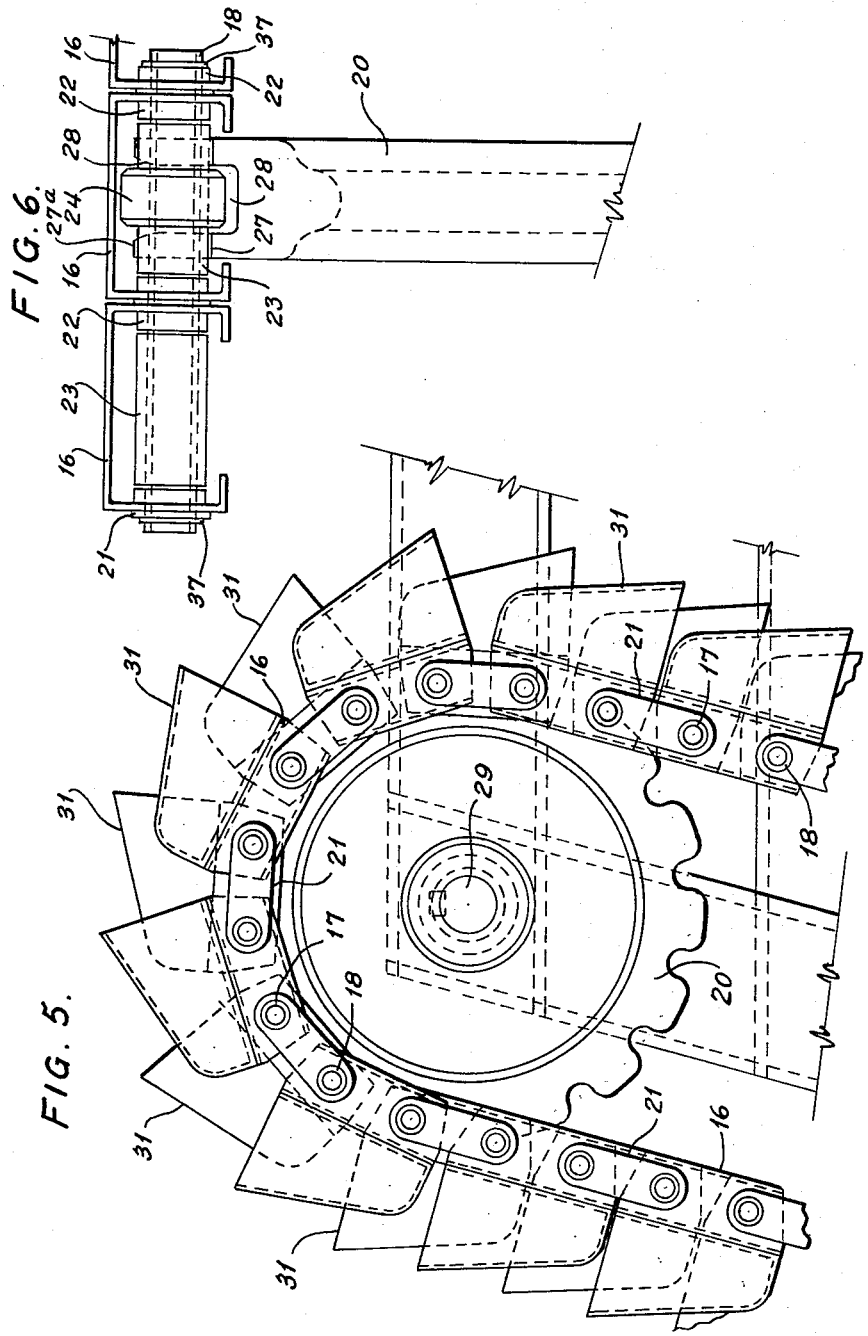

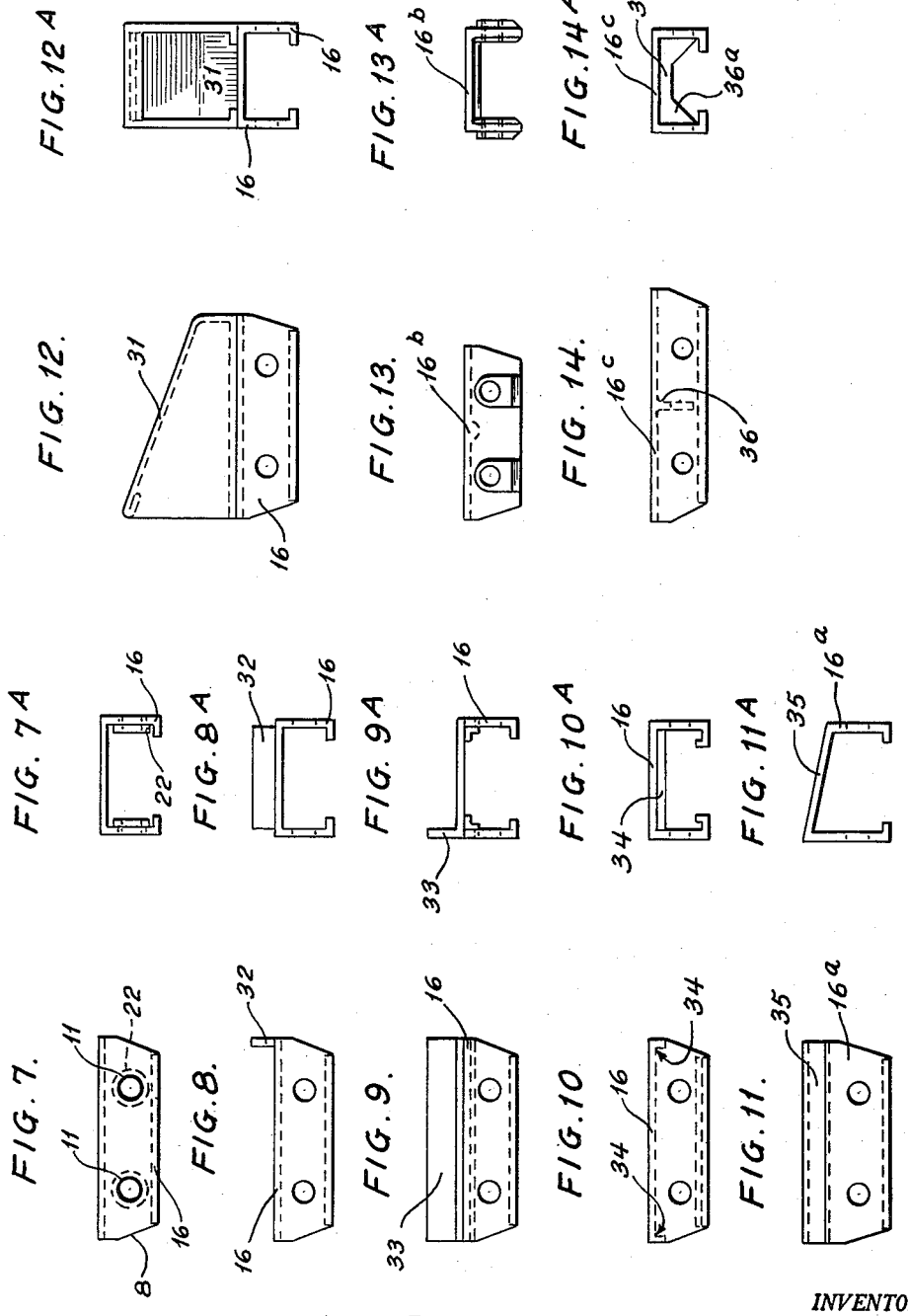

United States Patent Office 3,044,604
Patented July 17, 1962

3,044,604
CONVEYORS
Johann Hans Steigleder, 6 Maud St., Granville, near
Sydney, New South Wales, Australia
Filed Oct. 21, 1958, Ser. No. 768,746
9 Claims. (Cl. 198—193)

This invention relates to conveyor of the type formed of a series of interlinked members presenting an endless belt for the conveyance of goods and the like for a wide range of both commercial and industrial uses.

The conveyor of the invention has been specially devised to provide a novel interlocked link arrangement which can be readily produced to suit a varied and wide range of requirements and which is stronger and more durable than the known types of conveyors and offers many advantages which will be apparent from the following description.

According to this invention, the conveyor is characterized in that it is constructed of a series of transverse lines or rows of link members of open ended inverted channel form interlocked together in pivotal or hinge-like manner to form an outer substantially continuous conveying area or surface. The outer links at each side of the conveying surface have their adjacent pairs of pivots connected by bars or the like. The resultant conveyor is fitted over suitable rotatable driving means, and such driving means is connected to a source of power supply for operation.

In some forms of the conveyor a portion at each side of the conveying surface is angled, that is, inclined from the usual plane of travel of such surface, the angle being governed by the particular requirement.

Where the conveyor is of wide form or has to carry excessive weight, there may be roller or other suitable means provided on the underside of the conveying surface at one or more spaced locations to help support such weight. There may be formed to move over suitably formed tracks, rails or the like affixed to an anchorage such as a base frame or other convenient structure associated with the conveyor or its mounting.

In certain forms of the conveyor of the invention, the link members or top portion thereof may be of plastic material particularly when used for food processing and the like. These or certain other parts may be of plastic material or be faced or coated therewith.

The link members may be formed in any required length so that while the conveyor may be constructed of one series of link members of one type other forms having varied lengths may be interposed.

In order to describe the invention more fully reference will now be made to the accompanying drawings, wherein:

FIGURE 1 is a side elevation of one end of a standard form of the conveyor,

FIGURE 2 is an enlarged sectional view showing several of the link members pivoted together and positioned over the drive sprocket, FIGURE 3 is a vertical fragmentary sectional view of a portion of the structure of FIGURE 1, taken generally on the line 3—3 of FIGURE 1 and looking in the direction of the arrows, FIGURE 4 is a plan view of a level portion of said conveyor, FIGURE 5 is a side elevation of one end of a modified form of conveyor for picking up and conveying material, FIGURE 6 is an enlarged transverse detail view at one side of the conveyor shown in FIGURE 1, illustrating the mounting of the conveyor belt on the sprocket, FIGURES 7 to 14 inclusive are side elevations and FIGS. 7A to 14A are end elevations respectively of eight varied forms of link members for use in making up the conveyor of the invention to suit different requirements of use as hereinafter described in detail.

Referring to FIGS. 1–4 inclusive, the conveyor belt or platform, generally indicated at 15, is shown as being made up principally of link members 16. The link members 16 are of oblong inverted channel form and as here shown are all of the same uniform type, with depending side walls 6 and inwardly flanged lower edges 7. The ends of the link side walls 6 are beveled downwardly and inwardly, as seen at 8, to provide clearance to enable the links to deflect from the horizontal and also to enable them to turn around the mounting and driving sprockets. One of such sprockets for the driving of the conveyor belt or platform 15 is shown at 20 in FIGS. 1, 2 and 3.

In the makeup of the conveyor platform, the link members 16 are arranged in adjacent lines, which lines are disposed in parallel and have suitable spacing washers 10 therebetween. The link members 16 in the adjacent parallel lines are staggered longitudinally with respect to each other, as best seen in FIG. 4, and the overlapping links of adjacent lines are pivotally secured together. In this way the whole assembly is interlinked without any transverse link end spacing line extending across the platform and without any portions of the area of the assembly being unsupported. In fact, as seen in FIG. 4, no transverse spacing lines extend for more than the width of a single link.

In the particular example shown in FIG. 4, seven parallel lines of link members 16 are used in making up the conveyor platform and the overlapping portions of members 16 in adjacent parallel lines are pivoted together by pivotal axle members. Here such axle members are of three different sizes, or lengths, the longer axle members being shown at 17, the medium length ones being shown at 18 and the short ones being shown at 19. Referring again to FIG. 4, it will be seen that the long axles 17 and the medium ones 18 are employed alternately throughout the length of the conveyor platform. In the seven parallel line arrangement shown, the fourth line 12 of link members inwardly from each side serves as the medial line and, as seen, the long pivotal axles 17 extend inwardly from the outside surfaces of the link members at opposite sides of the conveyor platform through the links of the first, second and third lines and through the nearest side wall 6 of the overlapping link in the medial line 12. The side walls 6 of the links each have pairs of axle receiving bores 11 therethrough for the pivotal reception of the axles.

The medium length axles 18 alternating with the long axles 17 extend from the outside side walls of the links along the sides of the conveyor platform through both side walls of the overlapping links in the first and second lines inwardly thereof and then extend through the first side wall of the overlapping links in the immediately adjacent third lines. Finally, the short pivoted axles 19, aligned between the ends of the medium length pivot axles, extend through both side walls of each of the links in the medial line of links, and then extend through the immediately adjacent side walls of the overlapping links in the lines of links at either side of the medial line.

As will be appreciated from the foregoing taken in conjunction with the showing in FIG. 4, there are no pivotal axles extending all the way across the conveyor platform from one outside link line to the other thereof. Thus flexibility of movement of the conveyor surface is provided but this is done without sacrificing the strength or weight carrying capacity of the construction.

On the outside of the outermost lines of the link members 16 extending portions of the pivot axles 17 and 18 are linked together in adjacent pairs by flat link bars 21. These link bars have bores receiving the ends of the axles and have their ends rounded, as seen in FIGURE 1.

The link members 16 may have short bosses 22 welded to the side walls thereof about the pivot axle holes 11 as seen in FIGURE 3, or such bosses 22 may be formed integral therewith. There may also be spacing sleeves 23 fitted on the pivot axles 17—18 and 19 between the bosses 22. On conveyors for carrying heavy loads where it is desirable to provide support between the sides of the conveyor platform rotatable collars 24 are provided on some of the axles between the sides of the links, as seen in FIGS. 2, 3, 4 and 6. These collars or rollers 24 run on tracks 25 supported on a frame generally indicated by reference 26 as seen clearly in FIGURE 3.

In some constructions a main pivot axle indicated at 38 in FIGURE 4 may extend from side to side of the conveyor and one such axle may be disposed at each interval of from three to four yards or at other spacings according to requirements.

The link bars 21 may be secured on the pivot axles in any suitable manner, as by clips 37. Alternately, nuts or other known fastening may be used and similar means may be applied to the said pivot axles to retain the same in position.

The sprockets 20 are of any form suited for the purpose. They have a series of transverse recesses 27 separating teeth 27a. The peripheral face of the sprocket is formed with medial groove 28 therein to enable it to bridge over and pass by the rollers 24, as seen in FIGS. 3 and 6. The sprockets 20 are mounted on cross shafts 29, themselves mounted for rotation and having one or more drive connections to a power source in known manner.

In FIGURE 2, a spring gap closure element 30 is shown as affixed at one end to one link member 16 and as extending across the gap between that one link and the next one to it with the remote end of the element 30 seated beneath the adjacent end of the next link member 16. As the link members 16 change direction in turning about the sprocket 20 a series of these closure elements 30 serve to close up any gaps between link ends and therefore stop the spilling of any material being carried on the conveyor, as for example, small matter or fine substances.

Referring to FIGURE 5, the outer or top face of each link member 16 has an "envelope" member 31 secured thereto to create a beaker or cup-like formation for material of suitable nature to be picked up, conveyed along and then discharged.

Referring to FIGURES 7 and 7A, these show a standard form of link member 16 per se as heretofore referred to.

FIGURES 8 and 8A show the link 16 as equipped with a transverse upstanding flange 32 at one end to be used for certain purposes to engage with the material being conveyed.

FIGURES 9 and 9A show a link 16 as equipped with a flange 33 at one side thereof to act as a side stop or guard to prevent any material or articles being conveyed from falling off one side.

FIGURES 10 and 10A show a link 16 as provided with webs 34 extending transversely of the underside of the top surface of the link, one at each end thereof, to act as a reinforcement which may be desirable if heavy matter, mechanical parts or the like are to be carried.

FIGURES 11 and 11A show a modified form of link member 16a which has its carrying face 35 sloped transversely to assist in keeping material on the conveyor.

FIGURES 12 and 12A show the link member 16 with the envelope member 31 secured thereto as previously described. In this example the member 31 of scoop-like form is secured to the top face of the link 16 basically of standard form. It will be appreciated that the member 31 may be of any appropriate contour to suit a particular requirement and is not limited to the precise form shown.

In FIGURES 13 and 13A the link member 16b shown is suited for production out of plastic material and would be usable for the handling of foods and the like.

In FIGURES 14 and 14A the link member 16c is longitudinally extended and has a medial transverse rib 36 across the underside of the top, which rib extends down in triangular side portions 36a at each side thereof.

This member is suitable for the making of gangways, bridges, platforms, and the like and may be assembled into a conveyor in similar manner to that already described.

While certain examples of the conveyor of the invention and linkages therefor have been set forth above, along with manners of linking the members together, it is to be understood that the invention is not limited to the precise examples shown, as the constructive principles set out may be modified in other ways to suit various requirements, all such alternations being within the spirit and scope of the invention as defined in the appended claims.

I claim:

1. An endless belt conveyor presenting a continuous table-like conveying surface which comprises an assembly formed of a plurality of series of link members, the link members of each of said series being of rectangular open ended inverted channel form and being disposed in end to end relationship, and said series of said assembly being disposed in side by side parallel rows, the links in each of said rows being staggered in relation to the links in the next adjacent row, the sides of said link channels being formed with pivot openings therethrough, pivot axles for reception within said pivot openings and for the pivotal mounting of said links of one series with respect to said links of adjacent series, said pivot axles being of shorter extent than the width of the total number of rows in said series, said pivot axles being mounted in said pivot openings for the interlinking together of adjacent link members in said staggered relationship, each of said link members in each of said series of rows being pivotally interlinked to an adjacent link member in an adjacent row, said pivot axles in adjacent axial lines across said conveyor connecting together different numbers of said link members and means to secure said links on said pivot axles to maintain said series and rows together in said assembly, said assembly being formed for engagement by drive means to drive said conveyor.

2. An endless belt conveyor as in claim 1 and each of said links having longitudinally spaced pairs of pivot openings formed through said channel sides, a pair of pivot openings adjacent one end of one link being aligned with a pair of pivot openings adjacent the other end of an adjacent link.

3. An endless belt conveyor as in claim 1 and certain of said pivot axles being mounted in pivotal engagement with links in only three of said adjacent series.

4. An endless belt conveyor as in claim 1 and certain of said pivot axles being mounted in pivotal engagement with links in only four of said adjacent series.

5. An endless belt conveyor as in claim 1 and certain of said pivot axles of said assembly being mounted in pivotal engagement with links in only three of said adjacent series and certain other of said pivot axles being mounted in engagement with only four of said links in adjacent series.

6. An endless belt conveyor as in claim 1 and the link members of said series from either side of the center portion of said conveyor outwardly having their top faces sloped upwardly towards the respective outer edges.

7. An endless belt conveyor as in claim 1 and certain of said pivot axles having collars mounted thereon for seating on tracks to support said conveyor in its travel.

8. An endless belt conveyor as in claim 1 and the outermost of said series of said links at either side of said conveyor at the outer sides thereof including means for connecting the pivot axles of immediately adjacent link members, said connecting means including flat bars formed with a pair of longitudinally spaced openings therethrough formed to receive said pivot axles, said flat bars bridging a space between adjacent links and being mounted on the immediately adjacent pivot axles of said links.

9. An endless belt conveyor as in claim 1 and spring-like closure members for closing the gap between opposed ends of adjacent links of each of said series, said spring-like closure members being secured to one of said link members and extending into overlapping engagement with the other of said link members.

References Cited in the file of this patent

UNITED STATES PATENTS

| | | |
|---|---|---|
| 1,313,266 | Couch | Aug. 19, 1919 |
| 1,724,150 | Webb | Aug. 13, 1929 |
| 1,907,637 | Woodman | May 9, 1933 |
| 2,045,646 | Harris | June 30, 1936 |
| 2,681,728 | Boron | June 22, 1954 |